Patented Oct. 2, 1945

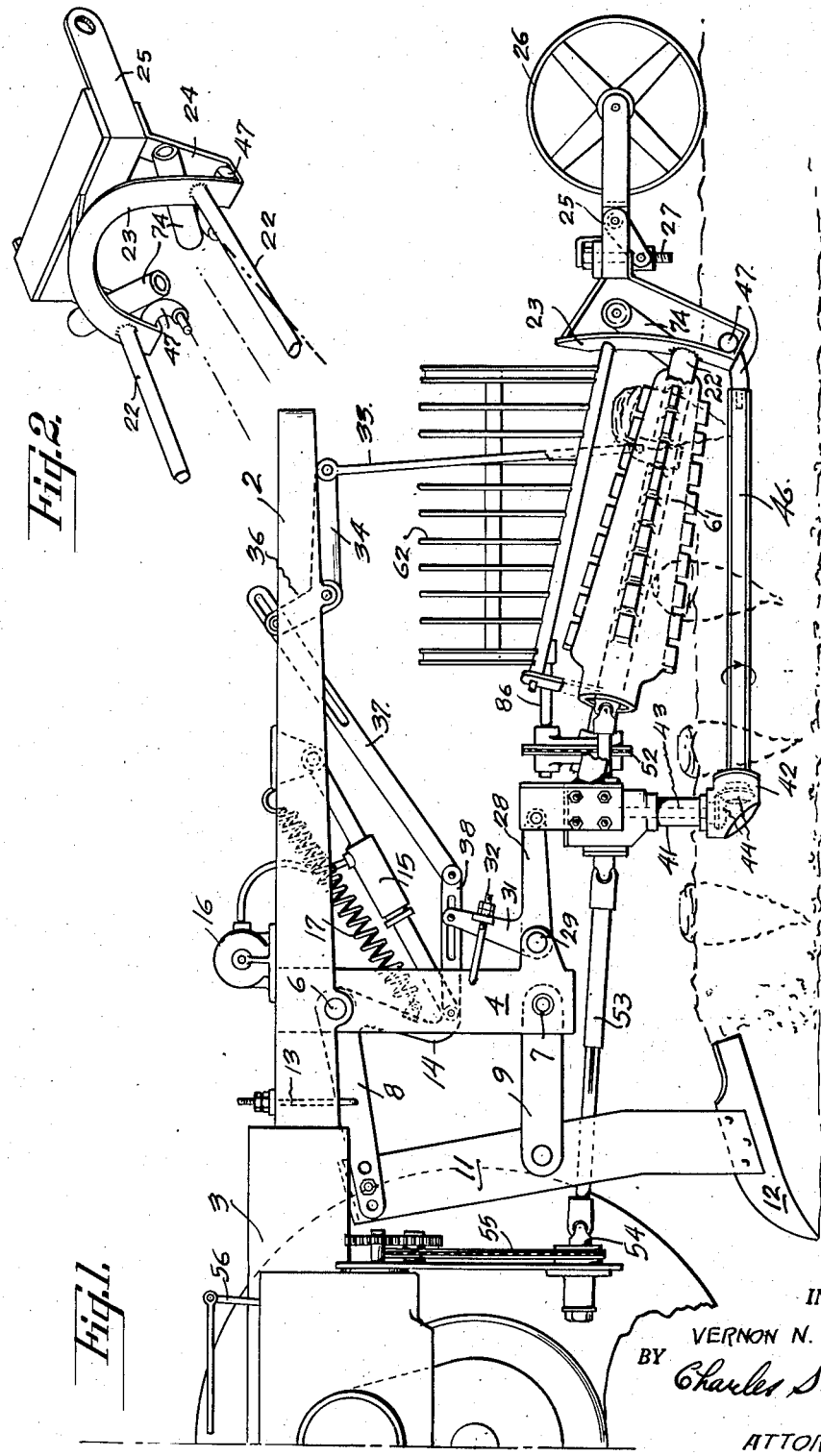

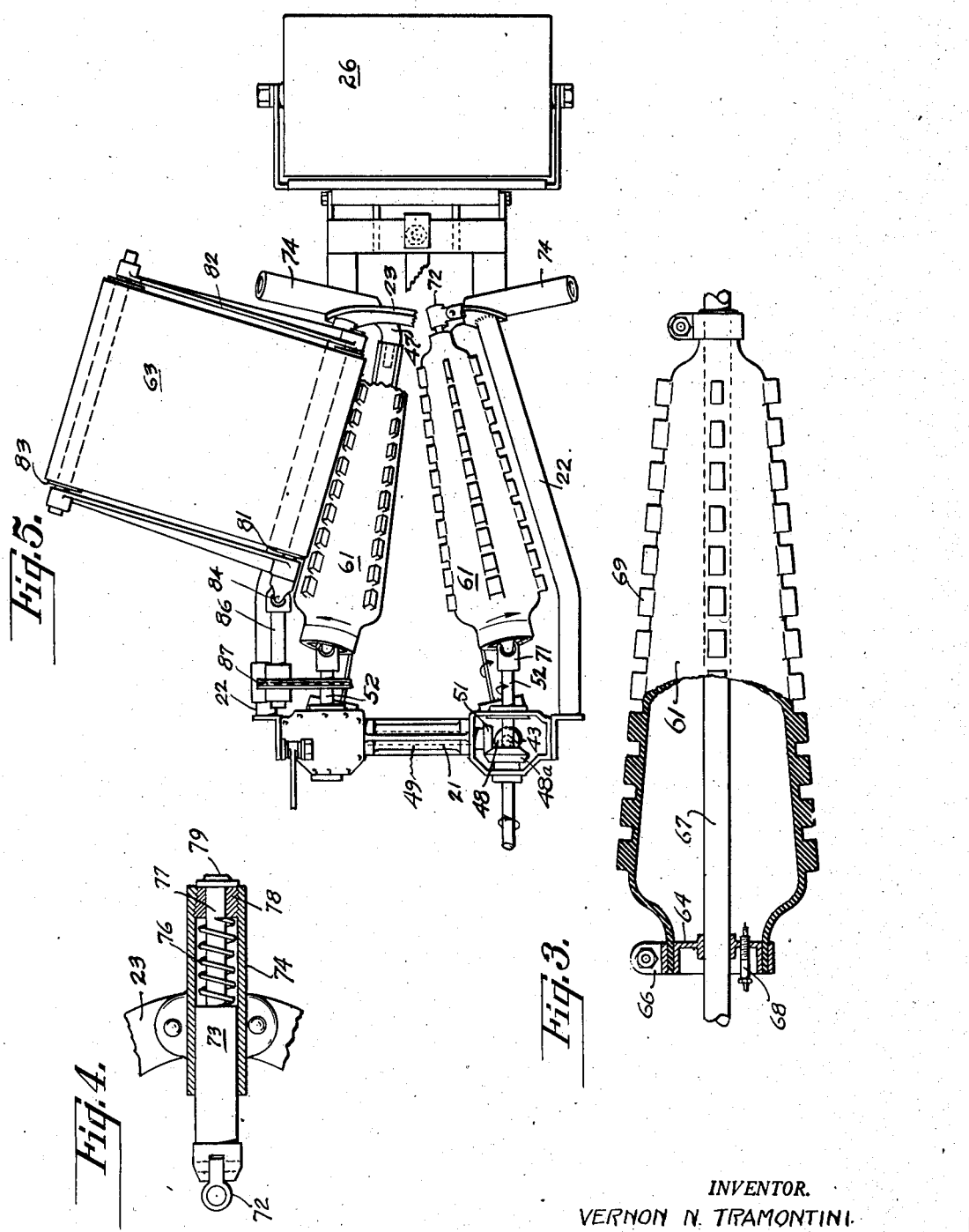

2,385,895

UNITED STATES PATENT OFFICE 2,385,895

BEET LIFTER

Vernon N. Tramontini, Chicago, Ill., assignor to United States Beet Sugar Association, Washington, D. C., a corporation of Utah Application October 2, 1943, Serial No. 504,720

10 Claims. (Cl. 55—106)

My invention relates to harvesting devices and particularly to machines for lifting from the ground roots of generally conical form such as sugar beets.

The broad object of my invention is the provision of mechanism, which when passing along a row of beets growing in the field, first lifts a ribbon of soil containing the beets and then picks the beets out of the soil and drops them on a conveyor which carries them to a point of deposit.

Specific objects include the provision of means for crumbling the soil surrounding the beets and at the same time jostling the beets upwardly and toward the center line; and also means for seizing the loosened beets without injuring them and without regard to their varying size, and tossing them upwardly and to the side upon a conveyor.

Other objects of the invention together with the foregoing will be made clear in the following description of my invention and the preferred embodiment of means for practicing the same, which is illustrated in the drawings accompanying and forming part of this specification. I do not limit myself to the showing made by the description and drawings, as I may adopt variations of the preferred forms within the scope of the appended claims.

In the drawings, Figure 1 is an elevation of my beet lifting machine and the rear end of the vehicle upon which it is carried. The machine is shown in operation. Figure 2 is a perspective diagrammatic view, showing the rear mounting of operating parts. Figure 3 is a detail of the pneumatic lifting roll in elevation and part section. Figure 4 is a detail of the rear bearing of the lifting roll. Figure 5 is a plan view of the beet lifter mechanism. In all of the views parts are omitted or broken away, the better to disclose the construction.

One of the principal problems encountered in the mechanical harvesting of sugar beets is how to effect discrimination between beets and surrounding soil lumps. The most obvious physical differences upon which such discrimination may be mechanically founded, lies in the essentially conical shape of the beets after they are topped, and the frangibility of the soil fragments. Another problem is how to move the beets growing in rows in the field into position where they can be dealt with effectively. Each of these problems is complicated by the fact that beets vary considerably in size at harvest time.

Irrespective of size however, the essentially conical shape of the beets suggests the path of approach to the problem, which breaks down into three main steps after the beets are topped. First a broad deep ribbon of soil containing a row of beets is lifted, breaking the tap roots of the beets and leaving them upright in an elevated and crumbled ridge of soil. Next the beets are jiggled or jostled sideways and upwardly while at the same time the surrounding soil is broken up and beaten so that the beets tend to float upwardly in the supporting small soil fragments, and move toward a center line. Finally the raised beets are seized between converging yielding rollers and tossed upwardly and to the side upon a conveyor, which carries them to the point of deposit.

In Figure 1 is shown the rear end of the tractor upon which my beet lifter is mounted. Preferably a beet topper mechanism is arranged on the forward portion of the tractor so that on one trip down the row, it both tops and lifts the beets.

Two cantilever arms 2, extend from the rear of the vehicle frame 3, one on each side; and on these frame arms the harvesting mechanism is hung. Extending downwardly from each arm 2 is a bracket arm 4, near the upper and lower ends of which the shafts 6 and 7 are journaled. These shafts extend transversely across the machine; the upper shaft 6 carrying near each end a fixed arm 8; and the lower shaft 7 having near each end the fixed arm 9. The outer ends of the levers 8 and 9 on each side are pivoted to a bar 11, on the inwardly extending lower end of which is fixed a plow share 12. For the sake of rigidity, the bars 11 preferably constitute the downturned legs of an inverted U-shaped piece. I have had excellent results with shares about 18 inches long and spaced apart about 7 inches at their leading points and about 1¼ inches at their trailing points, so that as they are moved through the ground at the proper depth, one on each side of a row of beets, a ribbon of soil containing the beets is lifted into a crumbled ridge, the tap roots of the beets being broken and the beets left in position to be further acted on by the mechanisms following. The depth at which the plow shares operate is fixed by the adjustable link 13 pivoted to the arm 8 but slidably held in the arm 2.

Rigidly fixed to the arm 8 on the left side of the machine is an arm 14, between the end of which and the frame 2 is interposed a hydraulic ram 15 controlled by a gear pump 16. Opposing the action of the ram is a coil spring 17 connected between the frame and lever arm.

There is thus provided a pair of spaced plow shares sloping downwardly and outwardly, mounted for up-and-down movement and controlled by the ram and spring. When the vehicle is traveling to and from the beet row, the ram is actuated to lift the plow shares to an inactive position above the ground. Preferably as shown, the two upper arms 8 are adjustably longer than the lower arms 9, so that the tilt of the plow points may be varied.

When the plow shares are raised to inactive position, the rest of the machine is also raised, but because the plow shares extend considerably deeper below soil level, their up-and-down movement is over a wider range than that of the soil breaking and lifting devices. These devices are arranged in a roughly quadrilateral frame comprising a transverse hollow bar 21 from the ends of which extend cylindrical side members 22 which converge downwardly toward the rear and are connected to the front part of the plate 23 which is shaped something like a horseshoe with its ends 24 folded back and up to connect with the fork 25, in which the rear supporting wheel 26 is pivotally mounted, and adjustably positioned by the screw 27.

The front end of the quadrilateral frame is pivotally supported by two lever arms 28, one near each front corner. These arms are fixed at opposite ends of a shaft 29 extending across the machine and journaled in the lower ends of the brackets 4. The arm 28 on the left side is provided with an upward extension 31 between which and the bracket 4, is arranged the link 32, adjustable in length to limit the lower position of the supported frame. The rear end of the frame is similarly supported from the cantilever arm 2 by a single link 33 pivotally connected to the rear end of the left side frame member 22, and to the arm 34 of a bell crank journaled on the arm 2. The other arm 36 of the bell crank has a pivot-and-slot connection to one end of the link 37, pivotally connected at its other end to the link 38, which is pivotally connected to the arm 14 coaxially with the latter's connection to the ram. The link 38 also makes a pivot-and-slot connection with the lever 31, and the proportion of all these parts is such that when the ram 15 is actuated, the plows are picked up first and are well on the way to their retracted positions when the pivots reach the ends of the slots in the links 37 and 38, at which time the lever arms 36 and 31 are pulled back, thus raising the quadrilateral frame and its contained mechanism to inactive position above the ground so that the vehicle can be moved about. Releasing the ram when the vehicle is astride a row of beets, permits the plows and the frame to settle into the soil to their adjusted positions as determined by the links 13 and 32 and screw 27. In this movement, the weight of the parts is supplemented by the pull of the spring 17.

Means are provided for breaking up the soil lumps in the crumbled ridge turned up by the plow shares; and at the same time jostling or jiggling the beets upwardly and sidewardly if they are out of the center line of the ribbon of soil. Extending downwardly from each front corner of the quadrilateral frame is a short hollow housing 41, terminating at its lower end in a head 42. Journaled in the housing is a shaft 43 connected by bevel gears 44 with the prismatic but preferably square roll 46, journaled at its forward end in the head 42, and at its rear end on a pin bearing on the arm 41 fixed on and projecting forwardly from the lower portion of the rear plate 23. The top of each shaft 43 is provided with a bevel gear 48 in mesh with bevel gear 48a on shaft 52, passing through and journaled in the end of the hollow bar 21 enlarged at this point to form a housing for the gears therein. Gear 48a is also in mesh with gear 51 on the shaft 49, journaled lengthwise in the bar 21. Because the whole frame is movable up and down, the shaft 52 is connected by means of universal joints and an extensible shaft 53 of splined sections to the drive shaft 54, suitably journaled on a bracket fixed on the vehicle frame, and driven by a chain connection 55 from the vehicle propulsion mechanism. A clutch, not shown, controlled by a lever 56 with operating link extending forwardly to the driver's seat provides means for starting and stopping the operation of the mechanism.

The arrangement of the parts is such that the two miller rolls 46 lie substantially in a horizontal plane one on each side of and in the ribbon of soil turned up by the plow shares. The heads 42 which are runner-beveled on their lower front faces lie in the furrow but the bars converge toward the rear where they are spaced closely enough to catch the smallest beets. The edges of the bars are rounded and as they rotate downwardly, then toward each other and upwardly, they perform two distinct functions. By their milling action in the soil, it is broken up into small fragments and spread or thrown to one side. At the same time the beets are jostled and nudged by the edges of the bars, each contact tending to raise the beet, and push it sideways if it is out of line, until both bars engage it at the same time, when it is lifted free of the soil fragments, into the range of the overlying grab rolls 61, which rotating toward each other at the bottom seize the beet and throw it upwardly against the deflecting bars 62 and onto the conveyor belt 63, by which it is taken to a hopper or bin, not shown, preferably carried on an accompanying vehicle.

Figure 3 discloses the construction of the grab rolls 61, each of which comprises a hollow, resilient, conical body preferably of rubber. Each end of the roll is sealed about a metallic flange 64 by a clamp 66, the flanges being tight on a shaft 67. A standard tire nipple 68 permits a low pressure inflation of the roll, preferably to 4 or 5 lbs; and to enhance the tractive hold on the beets of the roll surface or "tread," it is provided with a plurality of lugs 69 spaced about the surface, conveniently in longitudinally and circumferentially disposed rows as best shown in Figure 5. These converging, pneumatic, resilient and flexible rolls are very effective in grasping the beets without injury irrespective of their varying sizes and projecting them upwardly to the conveyor. The conical shape of the roll is dictated by the higher peripheral speed of the large end. By placing the larger end forward where the larger beets are seized, there is a tendency for the larger beets to be projected at a higher speed and to clear the rolls faster than smaller beets engaging the rolls further back. This prevents crowding of one beet by another and has the effect of smoothing out the flow of beets over the right hand roll to the conveyor, so that a succession of beets is delivered upon the conveyor rather than successive groups at intervals. Since the larger beets will be raised higher by the miller rolls, it is also preferred to journal the grab rolls so that the leading end is somewhat higher above the ground than the rear end.

The shaft 67 on which each pneumatic roll is mounted is connected through the universal joint 71 with the shaft 52 by which the roll is driven. At its rear end the shaft 67 is journaled in a movable spring-held bearing block 72, pivotally mounted on the plunger 73 slidably mounted in the cylinder 74 fixedly held on the rear plate 23. A spring 76 about the plunger stem 77 and interposed between the plunger and the cylinder head 78 tends to keep the plunger stem head 79 tight against the cylinder head; in which position the rear ends of the rolls are at their minimum spacing. In the event of a large beet or several smaller beets tending to jam between the rolls at any point and especially within the rear portions of the rolls, this resilient mounting aids the rolls to free themselves without injury either to the machine or to the beets.

The conveyor belt 63 may be arranged in any convenient fashion. I prefer to arrange it as shown in Figure 5, to discharge adjacent one side of the harvesting machine and preferably into a vehicle traveling alongside. The belt is relatively of short reach, the inner supporting pulley 81 being journaled in the angle of L-shaped bracket arms 82 fixed on the quadrilateral frame member 22 and the outer pulley 83 being journaled at the ends of the arms. The conveyor pulley 81 is driven through universal joint 84 by the shaft 86 connected to the shaft 52 on that side by a chain 87.

I claim:

1. A machine for lifting roots from the ground comprising a frame, plow means on the frame for raising a ridge of soil containing the roots, milling means arranged on the frame behind the plow means for reducing the soil fragments of the ridge to smaller size and for jostling the roots upwardly in the ridge, and grab rolls arranged on the frame above the milling means for seizing the raised roots and projecting them above the rolls.

2. A machine for lifting roots from the ground comprising a frame, plow means on the frame for raising a ridge of soil containing the roots, milling means disposed on the frame behind the plow means for reducing the soil fragments of the ridge to smaller size and for jostling the roots upwardly in the ridge, and a pair of converging and yielding grab rolls arranged in the frame above the milling means for seizing the raised roots and projecting them above the rolls.

3. A machine for lifting roots from the ground comprising a frame, plow means on the frame for raising a ridge of soil containing the roots, milling means disposed on the frame behind the plow means for reducing the soil fragments of the ridge to smaller size and for jostling the roots upwardly in the ridge, a pair of grab rolls arranged in the frame above the milling means for seizing the raised roots, laterally movable bearings on the frame for journaling one end of each grab roll, and means for rotating the grab rolls.

4. A beet lifting mechanism comprising a frame, a pair of spaced plow shares arranged on the frame for raising a ridge of soil containing the beets, a prismatic roll journaled on the frame behind each plow share, a pair of converging yielding grab rolls journalled on the frame above the prismatic rolls, power driven means on the frame for rotating the prismatic rolls to break up the soil fragments in the ridge of soil and jostle the beets upwardly therein, and drive means connected to the power driven means for rotating the grab rolls to seize the beets and project them above the grab rolls.

5. A beet lifting mechanism comprising a pair of spaced plow shares for raising a ridge of soil containing the beets, a pair of converging miller rolls of square cross section with rounded corners, one of said rolls being journaled for rotation behind each plow share, means for rotating the miller rolls to break up the soil fragments in the ridge of soil and jostle the beets upwardly therein, and means for seizing and lifting the beets from the position in which the the miller rolls leave them.

6. A beet lifting mechanism comprising a frame, a pair of spaced plow shares mounted on the frame for raising a ridge of soil containing the beets, a pair of miller rolls journaled in the frame for breaking up the soil fragments in the ridge of soil and jostling the beets upwardly therein, and a pair of conical rolls journaled in the frame for seizing the beets from the position in which the miller rolls leave them.

7. A beet lifting mechanism comprising a frame, a pair of spaced plow shares mounted on the frame for raising a ridge of soil containing the beets, a pair of miller rolls journaled in the frame for breaking up the soil fragments in the ridge of soil and jostling the beets upwardly therein, and a pair of converging conical rolls journaled in the frame and having yielding surfaces for seizing the beets from the position in which the miller rolls leave them.

8. A machine for lifting roots from the ground comprising a frame, plow means on the frame for raising a ridge of soil containing the roots, milling means arranged in the frame for reducing the soil fragments of the ridge to smaller size and for jostling the roots upwardly in the ridge, and a pair of conical grab rolls convergingly journaled in the frame above the milling means and with the larger ends leading and furthest apart.

9. A machine for lifting roots from a row in the ground comprising spaced plow shares for raising a ridge of soil containing the roots, a prismatic milling roll journaled behind each plow share, the rolls converging toward the center line of the row, a grab roll having a yielding surface journaled above each milling roll, and means for moving the plow shares through the ground and for rotating said rolls.

10. In a machine for lifting beets from a row in the ground, a vehicle frame, a pair of spaced converging plow shares pivotally mounted on the frame for raising a ridge of soil containing the beets, a second frame pivotally mounted in the vehicle frame, a prismatic milling roll journaled in the second frame behind each plow share for reducing the soil fragments of the ridge and for jostling the beets upwardly in the ridge and toward the center thereon, a pair of converging grab rolls journaled in the second frame above the milling rolls for seizing the beets, means for rotating the milling and grab rolls, and means for raising the plow shares and the second frame relative to the vehicle frame.

VERNON N. TRAMONTINI.